United States Patent [19]

Burke, Jr.

[11] Patent Number: 4,891,140

[45] Date of Patent: Jan. 2, 1990

[54] DESALINATION PROCESS

[76] Inventor: Jerry A. Burke, Jr., 2541 Stratford Rd., Richmond, Va. 23225

[21] Appl. No.: 295,147

[22] Filed: Jan. 9, 1989

[51] Int. Cl.$^4$ .................. B01D 17/00; B01D 17/038; B01D 21/26

[52] U.S. Cl. .................. 210/748; 210/774; 210/800; 210/222; 210/512.1; 210/513

[58] Field of Search .............. 210/748, 800, 801, 803, 210/804, 774, 805, 806, 808, 222, 513, 512.1, 512.3

[56] References Cited

U.S. PATENT DOCUMENTS 4,338,199 7/1982 Modell ................. 210/721

4,543,190 9/1985 Modell ................. 210/721

Primary Examiner—Frank Sever

[57] ABSTRACT

This invention teaches a method of removing dissolved minerals and organic material from water. The water is heated under controlled pressure to reduce the density and thus opening the molecular spacing of the water, such that mineral particles and organics cannot stay within the water molecule cluster, so fall out of solution. To speed separation of the mixture a hydroclone type centrifuge is used. The hot, high pressure clean water gives its energy back to the process through heat exchange and a hydraulic motor. The net energy used to effect dissolution is thus very low, being equivalent to pump loss and heat loss, from the equipment.

2 Claims, 2 Drawing Sheets

DESALINATION PROCESS

BACKGROUND OF THE INVENTION

The subject of this invention is removing salt from sea water. This has been an important subject for man ever since he started sailing on the ocean sea. Evaporation, by heat and condensing the vapor was the first practicable method used to obtain fresh water from salt water, and to this day it is the system most often used. The evaporation-condensing system has been greatly improved over the years, but attempts to reduce the cost of fresh water extracted from salt water, other systems have been developed. For instance, the reverse osmosis system and the electrodialysis system have been developed and put into use in many locations. Both these latter systems work well with brackish water, but become over loaded and inefficient with ocean salt water - also both systems have to process much salt water to get fresh water the ratio may be 4 to 1 in instances.

My process was invented while considering the problem of removing dissolved salt and organic material from stillbottoms of Ethanol plants. After study it appears to be much cheaper to operate on a straight one for one basis than any of the other methods. When it was found that 9 gallons of salt water was pumped to produce 8 gallons of fresh water and one gallon of strong brine, it was realized that a major improvement in the art of cleaning water had been made. Also there are no membranes to replace - so the process can stand to remove chemicals that destroy membranes. Thirdly the system removes all organic material, even dissolved protein. Fourthly, the system will be made of material that can withstand the corrosion and erosion associated with both salty, and fresh water. Screen and filters are used in some instances, but in general anything that can get through the pump will be cleaned from the water.

In the following specification the teaching is directed to removing dissolved salt from sea water, this is for simplicity in explaining the system. Actually the invented process will separate and allow removal of all dissolved solids and gases and some liquids from solution. Also an often contaminate of surface water and of industrial process water is organic material both in solution and in mixture. The process will remove those by destructive distillation. The products of destructive distillation will be either acid or basic, either will be neutralized by injecting the opposite to make a salt. The just made salt will be taken out by the hydroclone. Other minerals and metals that may be dissolved in trace quantities will also be removed in the hydroclone due to the wide spacing of the water molecules as provided for in this invention. Colloids are a finely divided material suspended in a fluid which are in fact a mixture, but have many physical qualities of a solution and are treated by some as a solution, either way this process will separate and remove the solids from water. The product water from this process is as pure water as can be obtained. It is sterilized and demineralized and de-metalized.

SUMMARY OF THE INVENTION

This invention employs pumps, heat exchangers, centrifuges, a hydraulic motor, a heat source and a hydraulic piping network to process sea water or industrial salt water into fresh water, meaning the water is de-salted, demineralized, sterilized, and is freed of organic matter.

Water to be cleaned is pumped into the system at approximately 3260 psia and is heated to critical temperature (705.4° F.) and is maintained at that temperature or above, until the salt and other minerals become undissolved and removed from the mixture by centrifuges.

During the heating period, organic material i.e. germs, virus, protein, fat etc. undergo destructive distillation, the residue from these occasionally form acids in water. If the acid is objectionable, a base material can be injected to neutralize the acid to form more salt in the mixture which will be separate along with the original salt. Once minerals have been removed the high pressure and temperature water will be put back into the main heat exchanger in heat exchange relationship with the cooler incoming contaminated salt water. The incoming water will receive most of its heat through the exchanger. The high pressure water will be let down to atmospheric pressure, through a hydraulic motor. The power developed in the hydraulic motor will be delivered to the pump. Thus very little new energy is required, to keep the process running, only replacement heat and power has to be added to make up the less than 100% efficient motive power and heat exchange. The energy input can be electric, internal or external combustion engine, fossil fuels, waste heat, geothermal heat or whatever is available. All of the above are included in this teaching.

Further - the process is carried out in hardware of a type commonly used in industry but modified to withstand the temperature and the pressure, if necessary.

While writing the specifications for the preferred embodiment of this invention it was impossible to give exact state points for the fluids entering the system while in the system and at system exit.

The feed water may be northern sea water or tropical sea water, the temperature may vary from 31° F. up to 90° F., on the other hand the feed may be an industrial waste water wherein both pressure and temperature may vary over a wide range also pressure does drop in a flowing system and the amount of the drop depends on the exact flow system. The exit temperature and pressure or certain station points can be maintained by pump and insulation adjustment. But there is a wide band of temperature and pressure at the feed to the process. The objective is to have the fluid heated and pressurized to the critical point upon entry to the hydroclone. Due to the nature of flow systems and particularly to components like hydroclone the pressure will drop during the passage through the component. Some hydroclones claim a pressure drop of 10 psi others are known to have a drop of 75 psi. Whatever the size of the drop the molecular spacing will get larger with the decrease in pressure provided the temperature stays up near critical. Because the heat in the fresh water is being used, through heat exchange to heat the incoming salt water to the critical temperature more heat and more pressure must be added to the fresh water before it enters the heat exchanger. The pressure should be high enough to keep the fluid or superheated steam dense enough to have a good heat exchange. The temperature should be enough above the critical temperature to bring the incoming fluid to critical temperature. The exact elevation depends on the type of heat exchanger equipment. Some exchangers work as close as one to two degrees separation. I have used approximately 5° separation on my calculations. So the result is the single state point is critical point entering the hydroclone. In fact if the critical point is achieved before the hydroclone or just inside the hydroclone the process will perform consequently we have tried to use middle band state points in the detailed description. In water a lower density is indicative of larger spacing between water molecules.

DETAILED DESCRIPTION OF THE PREFERRED EMBODIMENT

Figure 1:
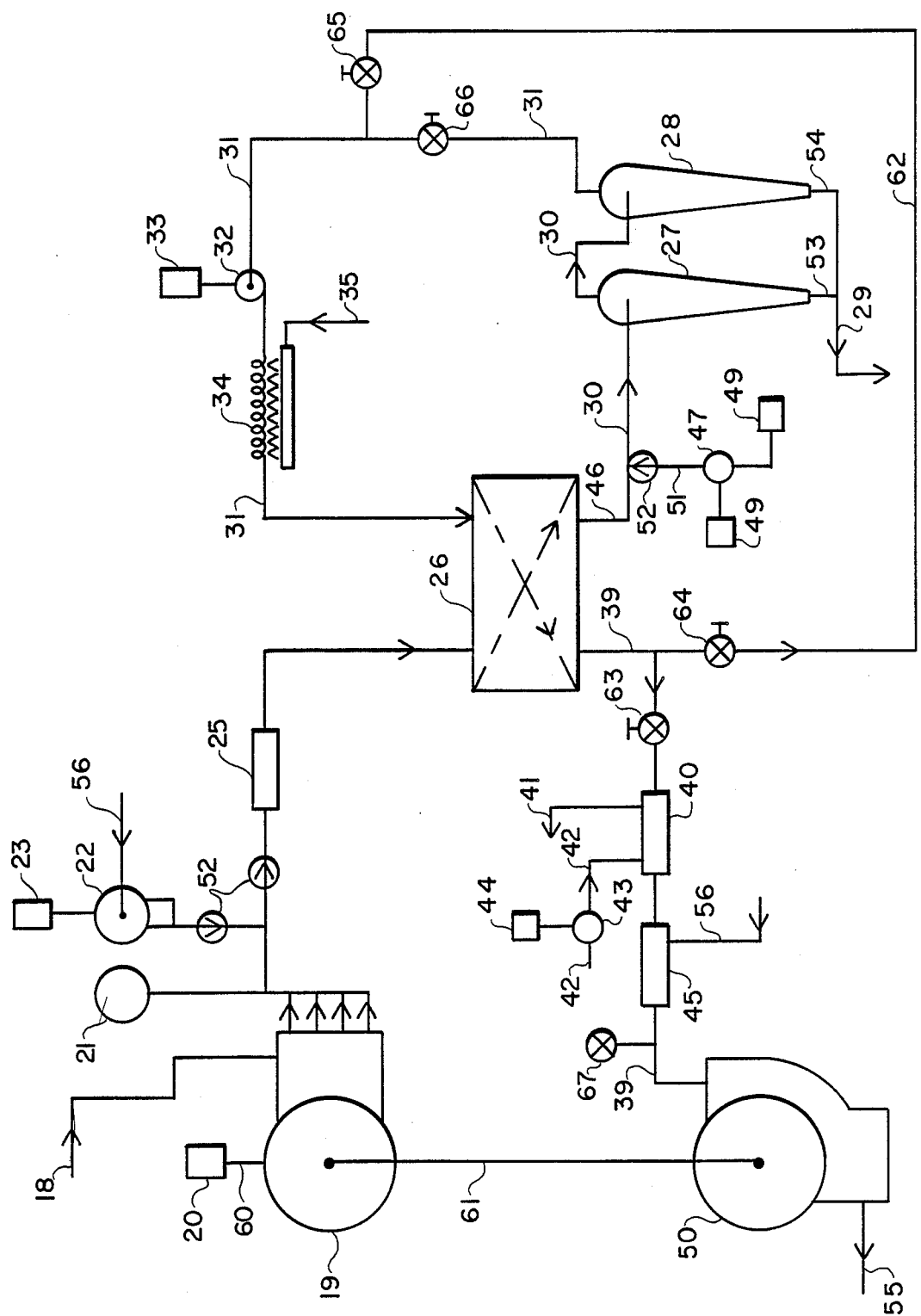
FIG. 1 is a schematic drawing of the process—with the components in symbolic form, connected by flow pipes represented as single solid lines—arrows on the flow lines show direction of flow.

Referring to FIG. 1 water to be de-mineralized is directed through line 18 to the large high pressure pump 19. The pump is driven by the electric motor 20 and the hydraulic motor 50, through connecting shafts 60 and 61. Most positive displacement pump impart a pulsating pressure variation to the pumped fluid, to reduce the pulsation air chamber 21 with a diaphrgm is connected to the main line 18 near the pump discharge.

The small high pressure pump 22 is driven by motor 23, and is supplied with fresh degassed water through line 56. Both pumps are protected by check valves 52.

An apparatus for magnetically treating fluids 25 is a patented device that splits the water flow into two or four or six streams, then applies a strong magnetic field to the streams, one half of the water receives a positive charge and the other half receives a negative charge. When the streams are brought together, the positive and negative particles are attracted to each other rather than to the container wall, thus keeping calcium, salt and other precipitates from sticking to the pipe and container walls as scale.

From the magnetizer 25 the high pressure (3256 psi) water is piped to the cold water inlet of the counter flow heat exchanger 26. The salt water passing through the heat exchanger is in heat exchange relationship to hot desalted and sterilized water flowing in counterflow direction. The cold water entering the exchanger may be near freezing or up to 200° F. and above depending on whether it is degassed and its source. The suspended scale can be removed before the heat exchanger just to reduce the solids load - or the calcium can be left in the system and removed with the salt further along. The salty water will exit the heat exchanger to line 30 at a pressure of 3206.2 psia and a temperature of 705.4° F. This state point is the critical point in the thermal state of water. The critical point condition is a single phase fluid, in which the water has expanded and steam compressed such that both have the same density and are non-distinguishable. The volume of the liquids expands from 0.016 cu. ft./lb. at 100° F. to 0.0503 cu. ft./lb. at critical point which is a ratio of 3.125. The rate of volume increase or density decrease and larger molecular spacing is not uniform, most of the expansion takes place between 700° F. and 705.4° F. at saturated conditions.

At the expanded condition that exist at or near the critical point the critical fluid can not retain any salt or other minerals nor ions of salt in solution. The reason is the salt is dissolved into solution in two ways. The first is, a small percentage of salt disassociates into positive and negative ions which cling to and are surrounded by water molecules of the opposite sign in the highly polarized water. The second way is the remaining salt that is dissolved is divided by the water into small clusters of salt molecules that find a nesting place within the close molecular structures of liquid water. The salt molecules clusters are salt in every chemical and physical way, they are just too small to be seen by the best optical microscope. Even so the water molecule is smaller than the salt molecules because the dissolved salt can be filtered out of water with a reverse osmosis membrane, which uses size of molecule to make a separation. When the water expands due to the high temperature at the critical point (705.4° F.) the space between the molecules increases such that the salt particles just fall out of the water molecular nest, and become suspended solids. Suspended solids even colloid material too small to settle can be centrifuged out of the critical fluid.

Figure 2:
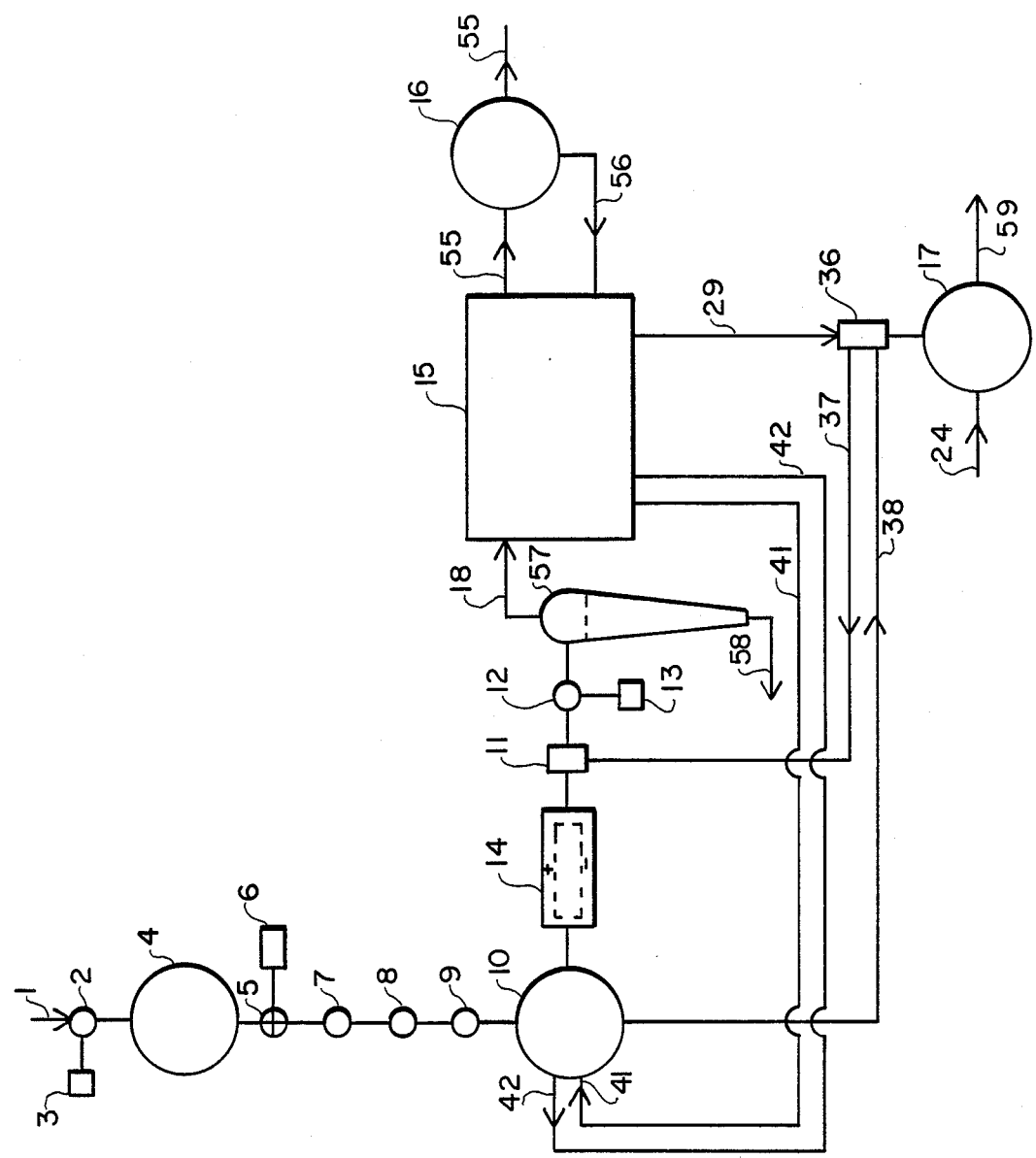
FIG. 2 represents the utility structure used to support the process. In this figure the process of FIG. 1 is represented as a rectangle or box 15. The utilities that feed the process with water to be cleaned, and those that remove the clean water and the byproduct are shown again in schematic form.

The critical fluid, with the now suspended solid salt and other solids enter the first Hydroclone 27 which for all intents and purposes is shaped like a cyclone separator which is widely known in industry for removing dust from air. The hydroclone for removing solids from liquids are also used in industry. The water enters the hydroclone tangentally and begins to spin around inside the conical section rapidly enough to impart up to 2000 gravities on the solid particles. Under such force the salt and all solids move to the outside and then slides down the conical walls and exit the cone at its bottom through oriface 53 to line 29. The solids can be made to retain enough water to move it in the pipe line 29. The thick brine may be further diluted with sea water in pipe 29 by pumping the sea water into 29. The high temperature heat in the brine is desirable and may be recovered through heat exchanger 36 in FIG. 2. The heat is transferred to source water or to sea water taken from the tank 10 and is sent to the degasser 11. FIG. 2. Depending on the efficiencies of the hydroclones a plurality may be used both in parallel and in series, 27 and 28 are shown in series. The demineralized and sterilized water exiting from the top of the last hydroclone will have lost some pressure and temperature due to the energy required to spin the fluid. To reestablish the lost energy the pressure and temperature have to be increased before the fluid re-enters the heat exchanger on the hot side. Pump 32, driven by motor 33 is used to boost the pressure in line 31 up to 3300 psia and heater 34 supplied by energy by line 35 is used to bring the temperature to 710° F. This state point is high enough to give a sufficient temperature differences to drive the heat transfer to the cold side of heat exchanger 26. A plate type heat exchanger can have the two streams 1° F. to 2° F. apart. The heat transfer that takes place in exchanger 26 actually recycles the heat from the hot side to the cold side. Pump 32 is used to replace the lost pressure in the flow systems, and heater 34 brings the temperature up to aid in the heat transfer. The heater 34 and the pump 33 could be installed before the hydroclone in line 30 and this application covers that configuration. But my preferred arrangement is to introduce the heat into desalted water in line 31.

The cooled fresh water, demineralized and sterilized water exists exchanger 26 to line 39 at a temperature about 1 to 2° F above the cold water entrance temperature to exchanger 26 and a pressure of approximately 3270 psia. There is still heat in the fresh water that can be used in the front part of the process ie the degasser. Heat exchanger 40 supplied by line 42 and pump 43 uses sea water circulated from tank 10 FIG. 2 to get the heat transferred to the inlet of the process. Pump 43 driven by motor 44 circulated the salt water from tank 10, FIG. 2 to gather up the otherwise waste heat from exchangers 36 in FIG. 2 and 40 in FIG. 1 which adds to thermal efficiency but does not change the salt water to fresh water, production ratio.

The product water from exchanger 40 is approximately 80° F. and the pressure is approximately 3270 psia. The exact pressure depends on the line loss through the systems after pump 32. But the water has energy that needs to be recycled. Shown in FIG. 1 is a hydraulic motor 50 driven by the water pressure which is let down from 3270 psia to atmospheric pressure. This is enough energy to supply most of the pump work in 19. Shaft 61 transfers the energy from the hydraulic motor 50 to pump 19. The electric motor 20 connected to 19 by drive shaft 60 supplies the power not supplied by the hydraulic motor 20. A pelton type water wheel could be used at 50. If so the speed range can be made to match the pump, but the Pelton wheel likes lower pressure than the 3270 psia exit. The high pressure can be used to educt more fresh water into line 39 at a lower pressure. Eductor 45 is fed fresh water from storage tank 16 of FIG. 2. Finished product water exits the motor and is sent to storage tank 16, FIG. 2. A high pressure piston hydraulic motor could be used for motor 50 in which case the eductor 45 would not be necessary.

Referring to FIG. 2 salt water from whatever source is sent by line 1 and pump 2 driven by motor 3 to the settling tank 4. The purpose is to remove the heavy solids and debris that will settle to the tank bottom. From the settling tank pump 5 driven by motor 6 sends the water through a plurality of screens and and filters 7, 8, and 9 to remove suspended solids, and on to the ready storage tank 10. The filtered salt water in tank 10 is warmed by heat from heat exchanger 40. It is warmed even more by heat from exchanger 36 as it enters the degasser 11. It is not necessary to remove the intrained and dissolved gases from the filtered water. But the capacity to desalt water of a given system size would be greater if degassed water is used. The type or design of the degasser is not specified, they are common in industry and those that use heat are more efficient in this application because the total temperature has to be raised from the ambient temperature up to the critical temperature area, and all heat added before the exchanger 26 FIG. 1 is useful. From the degasser salt water is drawn and is sent to the magnetizer 14 FIG. 2 and on to the low pressure hydroclone 57, from 57 water enters the process through pipe 18 FIG. 1 and FIG. 2.

The process shown on FIG. 1 is contained in the box 15 of FIG. 2. Depending on the size of the system, a pump 12 driven by motor 13 may be needed to give the flow volume needed for item 14 and 57, because the pressure drop through these latter pieces of equipment can be high. Since the degasser if used will be heated to 212° F. by plate exchangers which are easy to clean, and in view of the high magnetic charge on the scale particles no scale will form on the degasser components. Calcium precipitates out of water beginning at 165–180° F. The magnetizer 14 will make the positive and negative particles cling to each other. A portion of these calcium particles can be separated in item 57 by centrifugal force. The calcium goes to waste through line 58.

Depending on the water characteristics items 11, 13, 14 and 57 may not be needed. Also depending on the characteristics of the water the ready storage tank 10, the filter 5 and screens 7, 8, 9 settling tank 4 and associated pump may not be needed. In which case line 1 would become line 18 feeding the source water directly to the main line pressure pump 19. Though the waste heat from heat exchanger 40, FIG. 1 and 36 FIG. 2 would be added directly to line 18 by heat exchanger.

The most important state point of temperature and pressure in the process is that in which the molecular spacing is large enough so that the salt molecules can be separated or fall out of solution. Below the critical point at 500° F. is a transistion point in the specific density curve. Above this temperature and for each degree of higher temperature, a sharp decrease in density occurs. The curve steepens, from 700° F. to 705.4° F. the greatest change occurs, the curve becoming asymtotic up to the critical point. Also the temperature and pressure of saturated water have a known relationship such that for each temperature there is a minimum pressure, but a higher pressure can be superimposed. Super pressure is used in this process up to the critical point which is 3206.2 PISA and 705.4° F. (as given by Keenan and Keyes, 1936 edition, Thermodynamics Properties of Steam.) Above the critical point into the superheat region the temperature and pressure can be varied independently of the other. In this process it is desirable to keep the pressure above the critical pressure until the fluid enters the hydroclone. In the hydroclone the temperature stays the same, but the pressure drop from critical (3206.2). The pressure continues to drop, but exits the hydroclone at about 3169 psia. The critical conditions entering the hydroclone are sufficient to drop dissolved material from the critical fluid, however by having the pressure drop below the critical the density of the fluid, which changes to superheated steam, is further reduced and the molecular spacing increases even more. The more open the spacing the quicker the separation phase can be completed. Some salt will come out of the solution prior to 705.4° F., all will come out at 705.4° F., but to make the mechanical separation of the salt in the hydroclone more efficient and timely a temperature above the critical into the superheated steam area would not be objectionable, but a drop in pressure accomplishes the same objective. For instance at critical of 3206.1 psia and 705.4° F. the specific volume of the liquid and its vapor 0.0503 cu. ft./lb. and heat content is 902.7 btu./lb. To hold the pressure and raise the temperature to 702° F. the specific volume has increased to 0.1020 cu. ft./lb. The fluid is now steam and is not the critical fluid. The reduced density is moving in the correct direction but the increase in heat to reach the temperature is costly. It is preferred to keep the temperature and pressure as low as possible to effect solid salt separations. After separation to prepare the desalted water to be the heating medium on the return journey through heat exchanger 26, the pressure is elevated to 3300 psi and the temperature to 710° F. The increase in pressure by pump 32 is to increase the fluid density for better heat exchange and the increase in the temperature is to have a wider temperature difference in exchanger 26. The temperature in line 31 after heater 34 can be adjusted to be no more than necessary to get good heat exchange. Referring to FIG. 2, line 55 pipes fresh product water out of the FIG. 1 process to a storage tank 16, line 55 also supplies fresh water to its intended use. Line 56 carries fresh (Desalted, sterilized) water back into the process in FIG. 1. Fresh water is used to fill the system to effect a start up or a restart by pump 22 and to reduce the pressure in inductor 45. The by-product or waste salt is brought out of the process on pipe 29. Heat is taken from the waste salt by heat exchanger 36, FIG. 2. Shown on FIG. 2 line 24 is a salt dilution line which brings salt water from the source to dilute the thick brine in the tank, so that it can be pumped out to a disposal means. If a dry salt product is desired, then a sonic oriface could be installed in the cone bottom 53 and 54 which would let the exhaust salt and a little water exhaust into a vented hopper, which is not shown. The critical fluid would evaporate, leaving only a little water in the salt.

The organic material, including but not limited to protein, fat, oils, germs, virus, bacteria, mites, coliform and fungi will undergo destructive distillation in the heating sector of the process. Some of the components will form acids. If the acids are not useful to the intended use of the product water, the acids are removed, by injecting caustic (base) into the hot salty acid water at 46 FIG. 1. The caustic will neutralize the acid to salt. The newly formed salt in the mixture will be taken out by the centrifuge 27 and 28. The caustic will be injected through injector 51 by the metering pump. Item 52 is a reverse flow check valve.

Referring to FIG. 1 line 62 is a bypass from the cold outlet of heat exchange to help in starting the process and to keep some of the units warm while checks or minor repair or adjustments are made. The line is controlled by shut off valves 63, 64, 65, and 66.

The heater item 34 is represented to be a gas burner, heating a pipe coil. It is pointed out that the heater can be an internal or external electrical resistance heater, a micro wave heater, a steam or metal vapor heater, the type of heater does not affect or change the process. Also the location of the heater can be in line 30 between 26 and 27. In some cases one or more heaters will be used in both preferable locations.

The system will be monitored and controlled by pressure and temperature readings taken throughout the system. The flow rate can be monitored by the pump revolution rate. The instruments are not shown, but can be placed by those familiar with hydraulic flow system art. The specification describes the system running in a steady state. To start the system the following steps are recommended.

(1.) shut off flow to the hydraulic motor open the gas vent valve 67

(2.) start the low volume, high pressure pump 22

(3.) fill system with fresh water, pump through until air is purged (4.) raise the pressure to operating pressure (5.) turn on the heater to bring the system up to temperature under low flow conditions (6.) start the hydraulic motor and the main pump 19 and pump 32, stop pump 22

(7.) after temperature and pressure have stabilized, let the salt water into the system.

I claim:

1. In a process including the steps of subjecting a feed to critical conditions to pyrolize organic components therein and to precipitate inorganic components therefrom, sufficient for forming a solid phase suspended therein, and gravitationally removing said solid phase, the improvement comprising: magnetically pretreating the feed by dividing said feed into an even number of streams, positively charging half of said streams, negatively charging the other half of said streams, recombining said streams, sufficient for substantially reducing scale formation in the down stream piping carrying said feed.

2. In a system including means for subjecting a feed to critical conditions to pyrolize organic components therein and to precipitate inorganic components therefrom, sufficient for forming a solid phase suspended therein, and means for gravitationally removing said solid phase, the improvement comprising: means for magnetically pretreating the feed including means for dividing said feed into an even number of streams, means for positively charging half of said streams, means for negatively charging the number half of said streams sufficient for substantially reducing scale formation in the downstream piping carrying said feed.

* * * * *